US012722151B2

(12) United States Patent
Hu et al.

(10) Patent No.: US 12,722,151 B2
(45) Date of Patent: Sep. 1, 2026

(54) ANALYTE METERS, TEST STRIP EJECTORS, AND METHODS OF USING SAME

(71) Applicant: PHC Corporation, Ehime (JP)

(72) Inventors: Wei Hu, Shanghai (CN); Derong Chen, Shanghai (CN); Chao Li, Shanghai (CN); Thomas F. Hamilton, Surrey (GB); Youichi Tanizaki, Saijo City (JP); Yue Jiang, Shanghai (CN); James M. Coleman, Shanghai (CN); Yulun Chen, Taipei City (TW)

(73) Assignee: PHC Corporation, Ehime (JP)

( * ) Notice: Subject to any disclaimer, the term of this patent is extended or adjusted under 35 U.S.C. 154(b) by 162 days.

(21) Appl. No.: 17/573,590

(22) Filed: Jan. 11, 2022

(65) Prior Publication Data

US 2022/0219161 A1 Jul. 14, 2022

(51) Int. Cl.
*B01L 3/00* (2006.01)

(52) U.S. Cl.
CPC ....... *B01L 3/5023* (2013.01); *B01L 2200/025* (2013.01); *B01L 2200/04* (2013.01);
(Continued)

(58) Field of Classification Search
CPC ............. B01L 3/5023; B01L 2200/025; B01L 2200/04; B01L 2200/082; B01L 2200/10;
(Continued)

(56) References Cited

U.S. PATENT DOCUMENTS

| | | | | |
|---|---|---|---|---|
| 7,888,130 | B2 | 2/2011 | Wuske et al. | |
| 8,233,956 | B2 * | 7/2012 | Ohama ................ | A61B 5/1468 600/583 |

(Continued)

FOREIGN PATENT DOCUMENTS

| | | | |
|---|---|---|---|
| CN | 101501482 A | 8/2009 | |
| CN | 103959062 A | 7/2014 | |

(Continued)

OTHER PUBLICATIONS

WIPO Application No. PCT/EP2022/050384, Written Opinion of the International Preliminary Examining Authority, mailed Jan. 2, 2023.

(Continued)

*Primary Examiner* — Samuel P Siefke
(74) *Attorney, Agent, or Firm* — Erise IP, P.A.

(57) ABSTRACT

An analyte meter having a test strip ejector. The analyte meter includes a housing body including a front side, a back side, a first side, a second side, an end, and a test strip port at the end configured to receive a test strip; and a strip ejector configured to eject the test strip from the test strip port. The test strip ejector includes a slide member slidable relative to the housing body, an engagement member coupled to the slide member and configured to be contacted by a user, the engagement member located on the back side of the housing body opposite then display screen, and a push member coupled to the slide member and positioned to be engageable with the end of the test strip. Test strip ejectors and methods of ejecting test strips are provided, as are numerous other aspects.

23 Claims, 9 Drawing Sheets

(52) U.S. Cl.
CPC ..... *B01L 2200/082* (2013.01); *B01L 2200/10* (2013.01); *B01L 2200/141* (2013.01); *B01L 2300/027* (2013.01); *B01L 2300/0609* (2013.01); *B01L 2300/0663* (2013.01); *B01L 2300/0825* (2013.01); *B01L 2400/0478* (2013.01)

(58) Field of Classification Search
CPC ......... B01L 2200/141; B01L 2300/027; B01L 2300/0609; B01L 2300/0663; B01L 2300/0825; B01L 2400/0478; A61B 2562/0295; A61B 2562/22; G01N 33/4875; G01N 33/50; G01N 33/66
See application file for complete search history.

(56) References Cited

U.S. PATENT DOCUMENTS

| | | | |
|---|---|---|---|
| 9,805,165 | B2 | 10/2017 | Xiang et al. |
| 2006/0133956 | A1 | 6/2006 | Hamanaka |
| 2009/0108013 | A1 | 4/2009 | Van Der Velde et al. |
| 2009/0227854 | A1 | 9/2009 | Ohama et al. |
| 2010/0001253 | A1 | 1/2010 | Watanabe et al. |
| 2010/0012530 | A1 | 1/2010 | Watanabe et al. |
| 2012/0150448 | A1 | 6/2012 | Hurd et al. |
| 2014/0001044 | A1 | 1/2014 | Ecoff et al. |
| 2017/0319113 | A1 | 11/2017 | Hurd et al. |
| 2018/0322941 | A1* | 11/2018 | Krishnan ............... G16H 10/40 |

FOREIGN PATENT DOCUMENTS

| | | | |
|---|---|---|---|
| CN | 104165983 | A | 11/2014 |
| CN | 205263057 | U | 5/2016 |
| CN | 206804679 | U | 12/2017 |

OTHER PUBLICATIONS

International Search Report and Written Opinion of International Application No. PCT/EP/2022050384 dated Apr. 5, 2022.
WIPO Application No. PCT/EP2022/050384, International Search Report and Written Opinion of the International Searching Authority, mailed Jul. 14, 2022.
Taiwanese Patent Application No. 111101073, Office Action, issued Jun. 18, 2025.
Taiwanese Patent Application No. 111101073, Office Action, issued Dec. 11, 2025.
Chinese Patent Application 202110028945.4, Office Action, issued May 19, 2026.

* cited by examiner

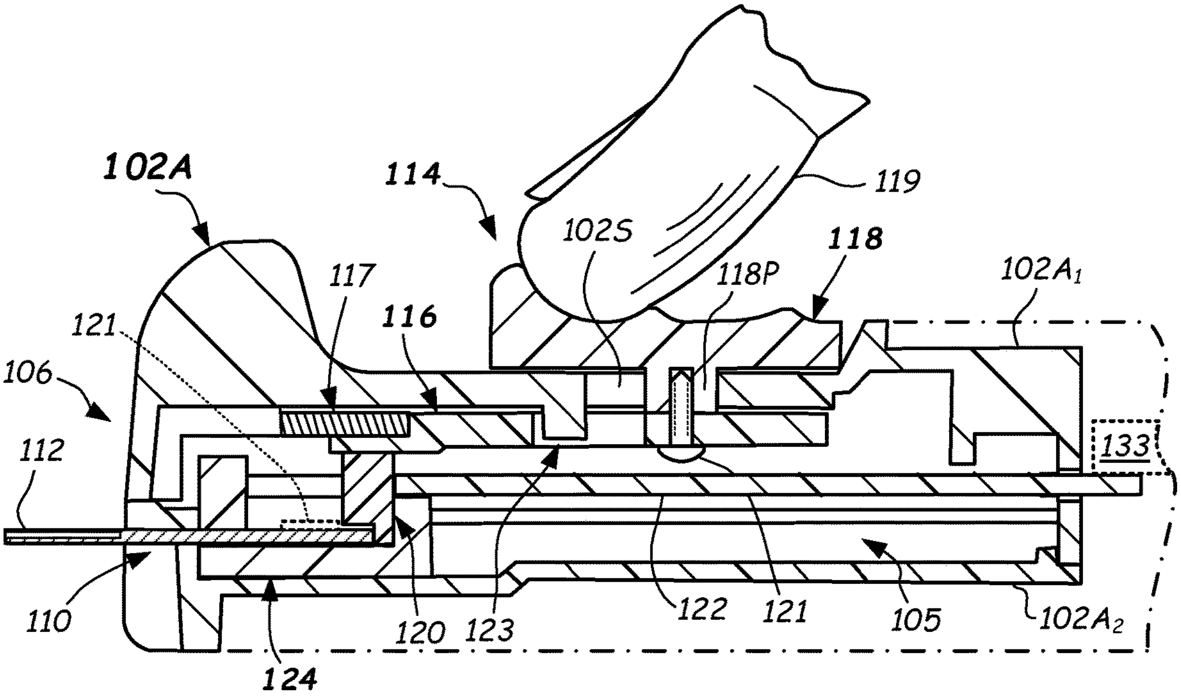
FIG. 1F
FIG. 1G
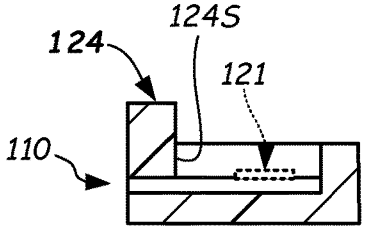
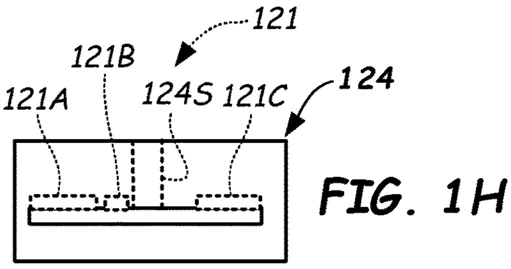
FIG. 1H
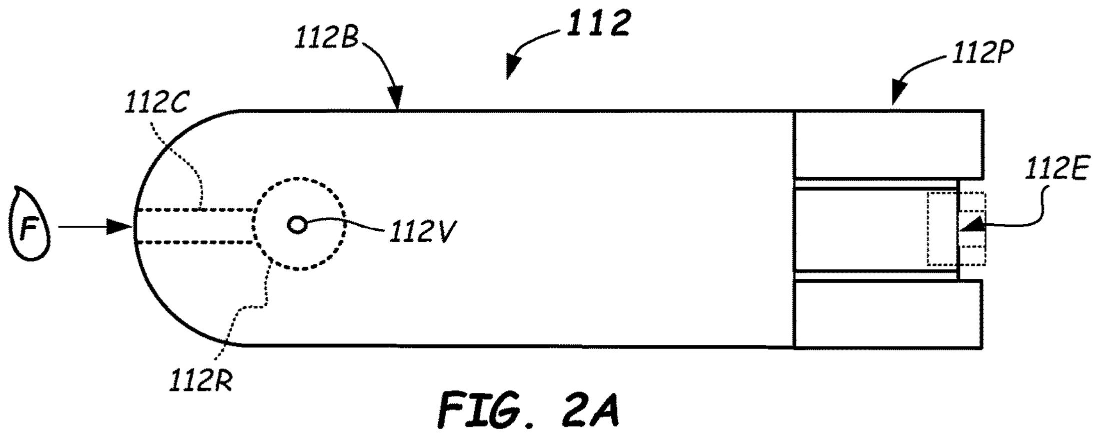
FIG. 2A

ANALYTE METERS, TEST STRIP EJECTORS, AND METHODS OF USING SAME

CROSS REFERENCE TO RELATED APPLICATION

This application claims priority to, and the benefit of, Chinese Patent Application No. 202110028945.4, entitled "ANALYTE METERS, TEST STRIP EJECTORS, AND METHODS OF USING SAME" filed Jan. 11, 2021, the disclosure of which is hereby incorporated by reference in its entirety for all purposes.

FIELD

The present disclosure relates to test strip ejectors of analyte meters used to eject a test strip after use, analyte meters, and methods using such test strip ejectors.

BACKGROUND

The monitoring of analyte concentration levels in a bio-fluid (e.g., blood) may be used as part of health diagnostics. For example, an analyte test strip (e.g., glucose test strip) may be employed with an analyte meter for monitoring a patient's blood glucose level as part of diabetes care and treatment. The analyte meter may receive the test strip in a test strip port of the analyte meter, and make contact with an electrical circuit of the analyte meter for detecting an analyte concentration level in a bio-fluid sample, such as from a single drop of blood. For example, a blood sample may be obtained from the patient using a lancet (e.g., by a pinprick). Typically, after the blood sample has been obtained, the sample may then be transferred to test strip for measurement of the blood's analyte concentration level (e.g., a glucose concentration level).

After the analyte (e.g., glucose) reading is complete, the test strip is removed from the test strip port of the analyte meter, to ready the analyte meter to receive another test strip for the next analyte measurement.

SUMMARY

In a first aspect, an analyte meter is provided. The analyte meter includes a housing body including a front side, a back side, a first side, a second side, an end, and a test strip port at the end configured to receive a test strip therein, and a test strip ejector configured to eject the test strip from the test strip port, the test strip ejector further comprising: a slide member slidable relative to the housing body, an engagement member coupled to the slide member and configured to be contacted by a user, the engagement member located on the back side of the housing body, and a push member coupled to the slide member and positioned to be engageable with the end of the test strip.

In yet another aspect, a test strip ejector of an analyte meter is provided. The test strip ejector includes a housing body, an engagement member configured to be contacted by a user's digit, the engagement member located on a back side of a housing body, a slide member coupled to the engagement member and slidable thereby, a test strip receiver configured to receive a test strip in a test strip port thereof, and a push member coupled to the slide member, the push member moveable in the test strip receiver and configured to contact an end of the test strip, wherein sliding motion of the engagement member along the back side, causes the test strip to be ejected from the test strip port.

In a method aspect, a method of ejecting a test strip from an analyte meter is provided. The method includes providing an housing body having a test strip ejector integrated therein, the test strip ejector comprising: an engagement member located on a back side of the housing body, a slide member coupled to the engagement member and configured to be slidable therewith, a test strip receiver configured to receive the test strip in a test strip thereof, and a push member coupled to the slide member, the push member moveable in the test strip receiver; and with a user's digit, causing a sliding motion of the engagement member along the back side to cause the push member to contact an end of the test strip and eject the test strip from the test strip port.

Other features and aspects of the present disclosure will become more fully apparent from the following detailed description, the accompanying drawings, and the claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the disclosure in any way.

FIG. 1F is cross-sectioned side view of an example of an assembly including a test strip ejector of an analyte meter provided according to embodiments of the disclosure.

FIG. 1G is cross-sectioned side view of an example of a test strip receiver of an analyte meter provided according to embodiments of the disclosure.

FIG. 1H is front plan view of an example of a test strip receiver of an analyte meter provided according to embodiments of the disclosure.

FIG. 2A is a top plan view of an example test strip configured to be received in the test strip port of the analyte meter according to embodiments of the disclosure.

DETAILED DESCRIPTION

Figure 1A:
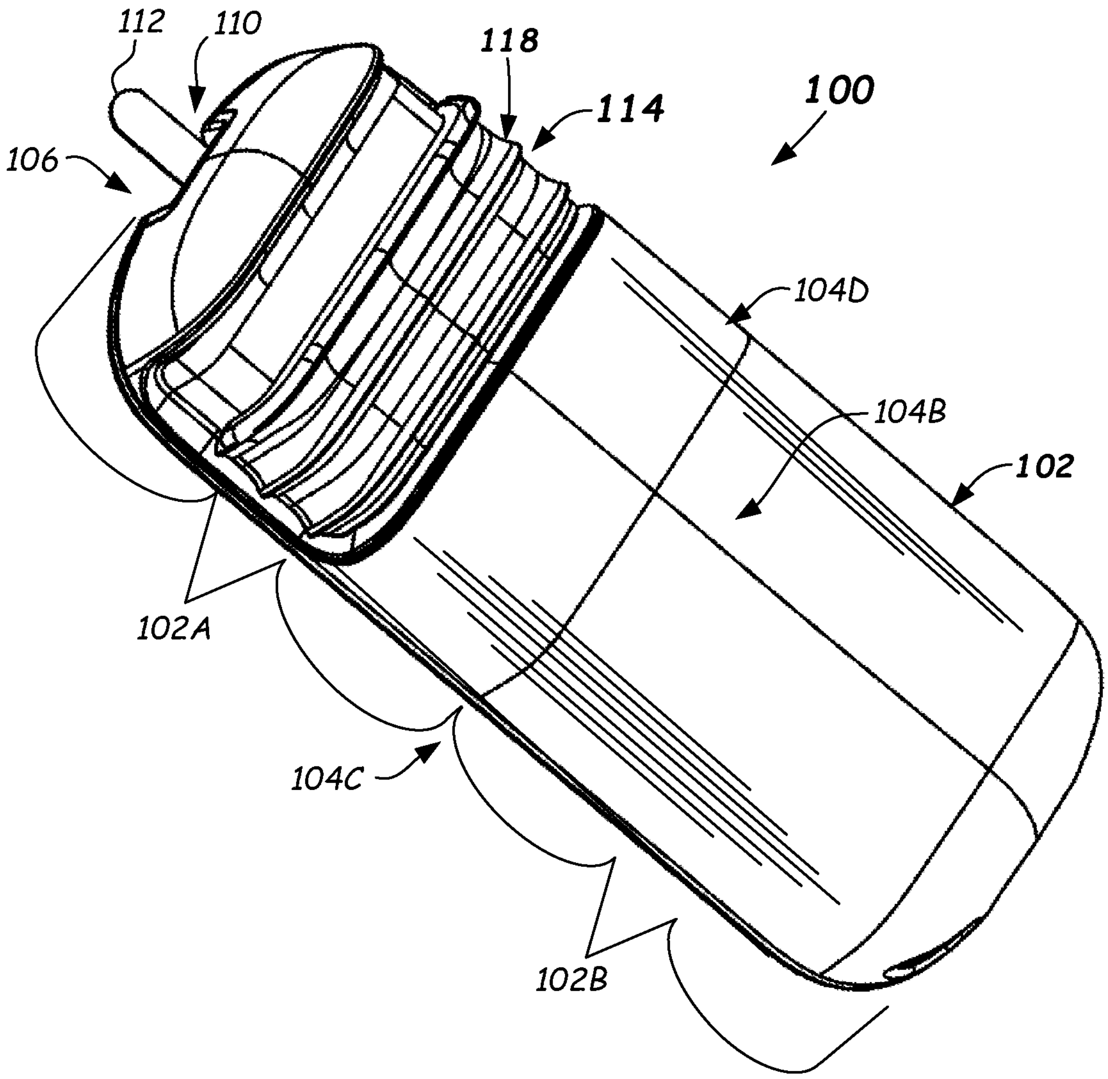
FIG. 1A is a bottom isometric view of an analyte meter including a test strip ejector enabling a test strip to be readily ejected from a test strip port according to embodiments of the disclosure.
Figure 1B:
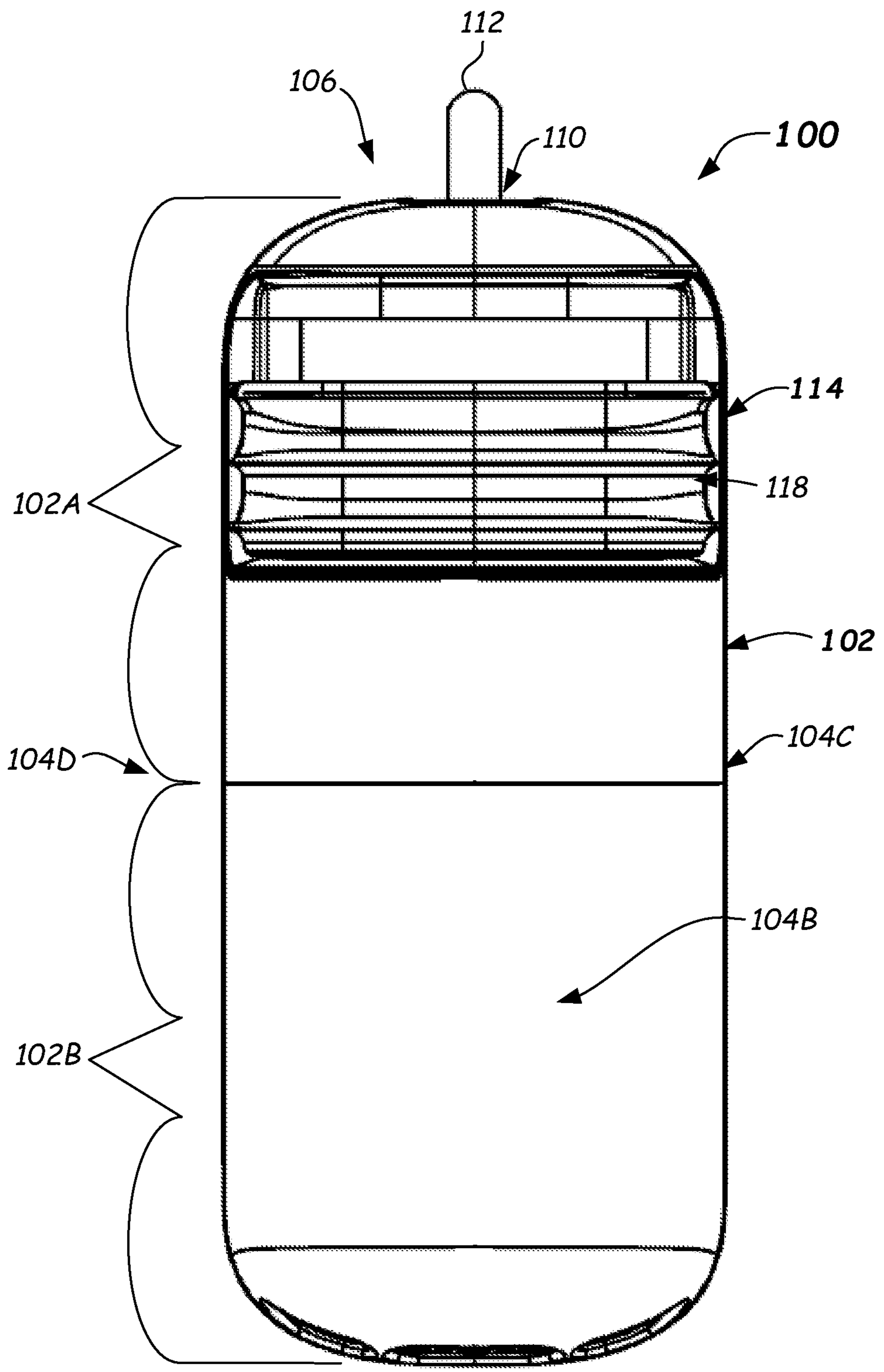
FIG. 1B is a bottom plan view of the analyte meter of FIG. 1A with the test strip ejector shown in a retracted starting position according to embodiments of the disclosure.

Removal of the test strip from the test strip port can expose the user's digits (e.g., fingers and/or thumb) or others to blood remaining on the test strip after use, which may cross contaminate, is messy, and may enable transfer of blood to other items such as skin, clothing, furniture, etc.

In view of these concerns, embodiments of present disclosure provide an analyte meter that includes a strip ejector that is configured to allow a user to readily and effectively eject a used and contaminated test strip from the test strip port. Ejection of the test strip can be accomplished with one hand, which can have significant value in a clinical setting, for example.

In a first one-handed example, ejection of the test strip can be accomplished in a first way with a single digit (e.g., index finger), while holding the analyte meter between the thumb and one or more of the other fingers, and without having to touch the test strip. In other embodiments, a 2nd way to eject the test strip can be accomplished by using the thumb to push a first side or a second side of an engagement member of the test strip ejector apparatus. In a 3rd way, the index and/or middle finger is used to push the first side or second side of an engagement member.

The test strip ejector includes an engagement member that is positioned on a back side of the housing body of the analyte meter opposite from the front side containing the display screen. In particular, the engagement member is configured to be engaged by the user's digit (e.g., finger) while holding the analyte meter. Sliding the engagement member engages and sides a sliding member and causes a push member to contact an end of the test strip and upon further motion of the engagement member, eject the test strip from the test strip port. The push member is received inside and is moveable within a test strip receiver. The test strip receiver is configured to receive the test strip and includes electrical contacts (e.g., conductive leaf springs or the like) formed therein that are configured to electrically connect to electrical contacts formed on the test strip.

The analyte meter in accordance with embodiments of the present disclosure may be used to measure any number of analytes, such as glucose, fructose, lactate, keytone, microalbumin, bilirubin, total cholesterol, uric acid, lipids, triglyceride, high density lipoprotein (HDL), low density lipoprotein (LDL), hemoglobin A1c, and the like. These analytes may be detected in, for example, whole blood, blood serum, blood plasma, interstitial fluid, urine, etc. Other types of analytes may be measured provided a suitable reagent exists.

These and other embodiments of analyte meters, test strip ejectors, and methods of ejecting a test strip from an analyte meter are described below with reference to FIGS. 1A-4.

FIGS. 1A-1E and 2A-2B illustrate various views of a first example of an analyte meter 100 including test strip ejector 114 according to embodiments of the disclosure. The test strip ejector 114 may be abbreviated herein as test strip ejector 114. The analyte meter 100 may include a housing body 102. The housing body 102 may be made up of multiple interconnected parts, such as first and second portions 102A, 102B and third portion 103 that engage each other to form an internal chamber 105 that is configured to contain various internal components of the analyte meter 100. The portions 102A, 102B, 103 of the housing body 102 may be formed of an insulating material such as a plastic and may be injection molded plastic parts, for example. Connection of the various portions 102A, 102B, 103 may be by adhesive, ultrasonic welding, screws, rivets, interconnecting snap fit connectors molded on the parts, or the like.

The housing body 102 may have a front side 104A, a back side 104B opposite the front side 104A, a first side 104C, and a second side 104D opposite the first side 102C, and an end 106. The end 106 can include, as shown, a test strip port 110 that can include a receptacle that is configured to receive the test strip 112 therein. The receptacle can include electrical contacts 121 that are configured to engage with contact pads 112P located on the test strip 112.

An example of a test strip 112 (sensor) is shown in FIG. 2A, wherein the test strip 112 includes a strip body 112B made up of multiple layers, a capillary passage 112C (shown dotted) connecting to a reaction region 112R containing one or more catalytic agents or reagents that are configured and compounded to react with a biological fluid F (e.g., blood) that is provided in contact with the reaction region 112R through application of the fluid F to the end of the capillary passage 112C during analyte measurement. The one or more catalytic agents or reagents can be an analyte-selective enzyme-salt combination that can convert an analyte (e.g., glucose) into a chemical species, which is electrochemically measureable in terms of an electrical current produced. The plurality of contact pads 112P, which may include a working electrode, a counter electrode, and/or a reference electrode, are individually contacted by electrical contacts 121 in the test strip receiver 124 when the test strip 112 is received in the test strip port 110 of the receptacle. Embodiments of such strip sensors are disclosed in U.S. Pat. Nos. 4,721,677, 5,798,031, 6,531,040, 7,118,668, and 8,679,309, for example.

One group of catalytic agents useful for providing the reaction region 112R may be the class of oxidase enzymes which includes, for example, glucose oxidase (which converts glucose), lactate oxidase (which converts lactate), and D-aspartate oxidase (which converts D-aspartate and D-glutamate). In embodiments in which glucose is the analyte of interest, glucose dehydrogenase (GDH) may optionally be used. Pyrolloquinoline quinine (PQQ) or flavin adenine dinucleotide (FAD) dependent may also be used. Catalytic enzymes other than oxidase enzymes may also be used.

The reaction region 112R may include one or more layers (not explicitly shown) in which the catalytic agents (e.g., enzymes) and/or other reagents may be immobilized or deposited. The one or more layers may comprise various polymers, for example, including silicone-based or organic polymers such as polyvinylpyrrolidone, polyvinylalcohol, polyethylene oxide, cellulosic polymers such as hydroxyethylcellulose.

A vent 112V in the form of a hole or perforation may be provided at the reaction region 112R to improve capillary action and flow of the biological fluid F into the reaction region 112R from the end 106 when applied thereat by the user.

As best shown in FIGS. 1F-1H, within the confines of the internal chamber 105, a portion or all of a printed circuit board 122 may reside. The printed circuit board 122 may include or be coupled to conventional electronic components such as processor and memory, power source, and power management, and the like. The printed circuit board 122 may be retained in a defined position within the internal chamber 105 by projections or recesses formed on, or in, the printed circuit board 122 and/or the body parts $102A_1$ and $102A_2$.

In operation, upon insertion of a droplet of biological fluid F into the capillary passage 112C such that the fluid F comes into contact with the reaction region 112R, and upon application of a suitable voltage bias across the contact pads 112P (e.g., about 300 mV), an electrical current may be generated that may be proportional to a concentration of the analyte present in the biological fluid F. This sensed electrical current may then be conducted by the electrical circuit including the contact pads 112P, the electrical contacts 121, and a conventional analyte measurement circuit (not shown). The calculation of the analyte measurement may be by any currently known method. The measured analyte concentration may then be displayed in any suitable readout form, such as in a display screen 125 of the analyte meter 100 (e.g., a blood glucose meter).

In more detail, analyte meter 100 can include a display screen 125 (e.g., a thin film transistor liquid crystal display (TFT LCD), in plane switching LCD(IPS-LCD), capacitive touch screen LCD, organic light emitting diode (OLED), active matrix OLED (AMOLED), and Super AMOLED, and the like) located on the front side 104A (See FIG. 1E), and a user interface (e.g., including one or more push buttons, keys, a scroll wheel or ball, and/or a touch screen as shown in this embodiment, or any combination thereof). As shown in the embodiment of FIG. 1E, a power button 126 may be provided on the front side 104A below the display screen 125. In some embodiments, the analyte meter 100 provides a sleek look by having the front side 104A including only a display screen 125 and a power button 126. The processor may be any suitable processor, such as a microprocessor device or collection of microprocessor devices that are capable of receiving the signals and executing any number of program routines, and may be a microcontroller, microprocessor, digital signal processor, or the like. Data received and/or processed by the processor may be stored in memory, which may store software routines that may be adapted to process raw analyte data and determine and display analyte measurement values.

In more detail, and as best shown in FIG. 1F, which is a cross-sectioned side view of a portion 102A of the analyte meter 100. The test strip ejector 114 is configured and operable to eject the test strip 112 from the test strip port 110 under the action of the user. The test strip ejector 114 further comprises a slide member 116 that is slidable within the housing body 102, formed as body part $102A_1$. The test strip ejector 114 can further include one or more springs 117 in contact with portions of the slide member 116 and portions of the portion 102A to spring bias the slide member 116 to a retracted starting position (as shown in FIG. 1F). Thus, after the test strip 112 is ejected from the test strip port 110, the one or more springs 117 move the engagement member 118 back to the retracted position at the starting end of the stroke as shown in FIG. 1F.

The test strip ejector 114 further includes an engagement member 118 coupled to the slide member 116 and that is configured to be contacted by a user's digit 119 (e.g., finger). The engagement member 118 is provided on the back side 104B, such that the housing body 102 can be held between the thumb and middle or ring finger or both and the index finger can be used to slide the engagement member 118 and eject the test strip 112 from the test strip port 110.

The engagement member 118 is coupled to the slide member 116 by fasteners 118F that connect and secure to posts 118P or other boss features formed on the engagement member 118. Posts 118P extend through slots 102S formed in first part $102A_1$. A limit stop 123 operates to limit the amount of sliding motion of the slide member 116 within pre-designed distance limits. Limit stop 123 can be made up of a first stop member 123A and second stop member 123B, such as post and slot shown. Post will only allow a predefined amount of sliding before the post contacts the end of the slot and limits further motion.

Figure 1C:
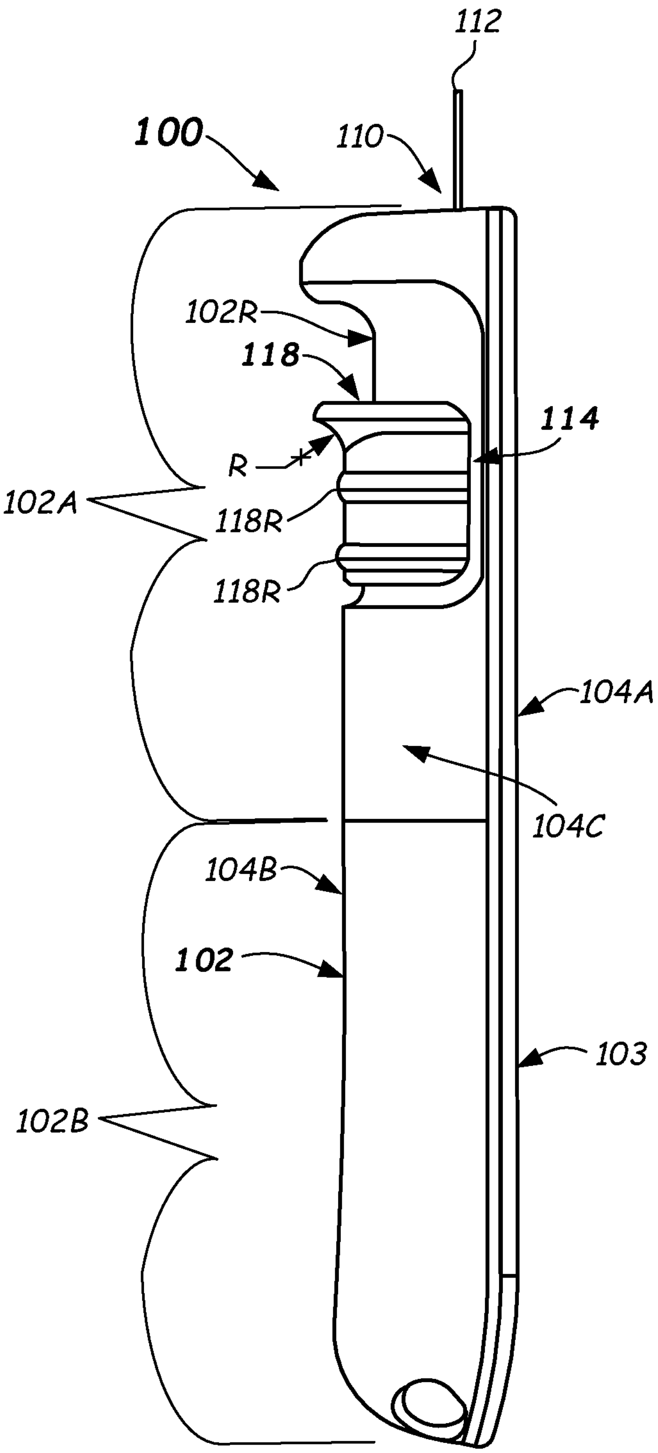
FIG. 1C is a left side plan view of the analyte meter of FIG. 1A shown in a retracted starting position according to embodiments of the disclosure.
Figure 1D:
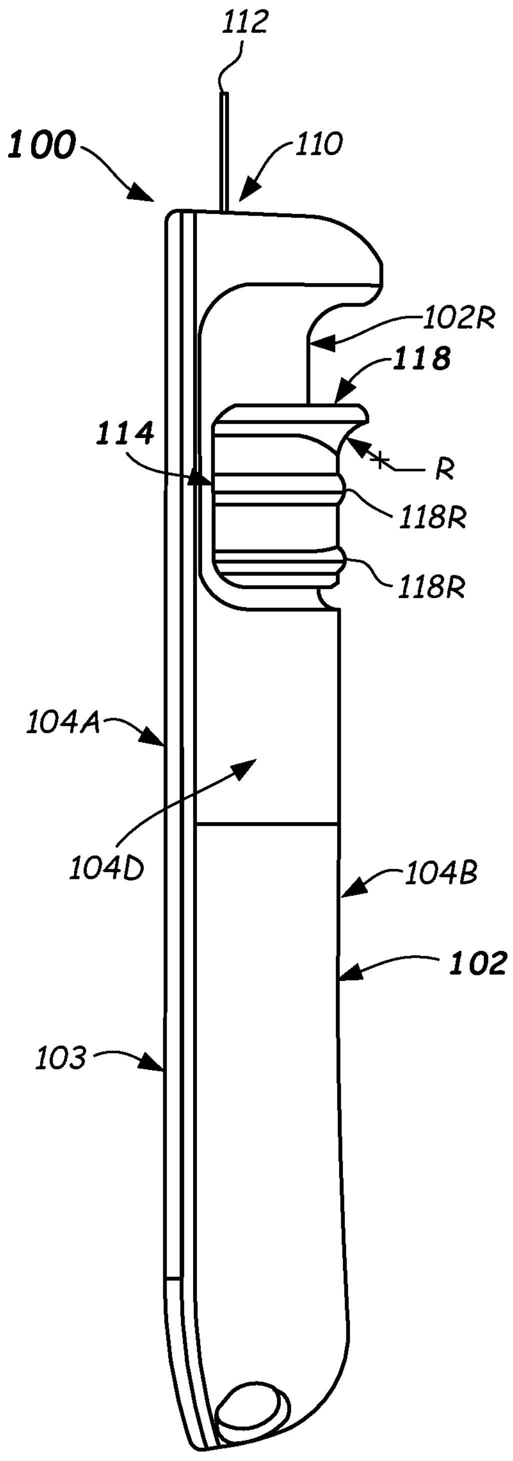
FIG. 1D is a right side plan view of the analyte meter of FIG. 1A shown in a retracted starting position according to embodiments of the disclosure.
Figure 1E:
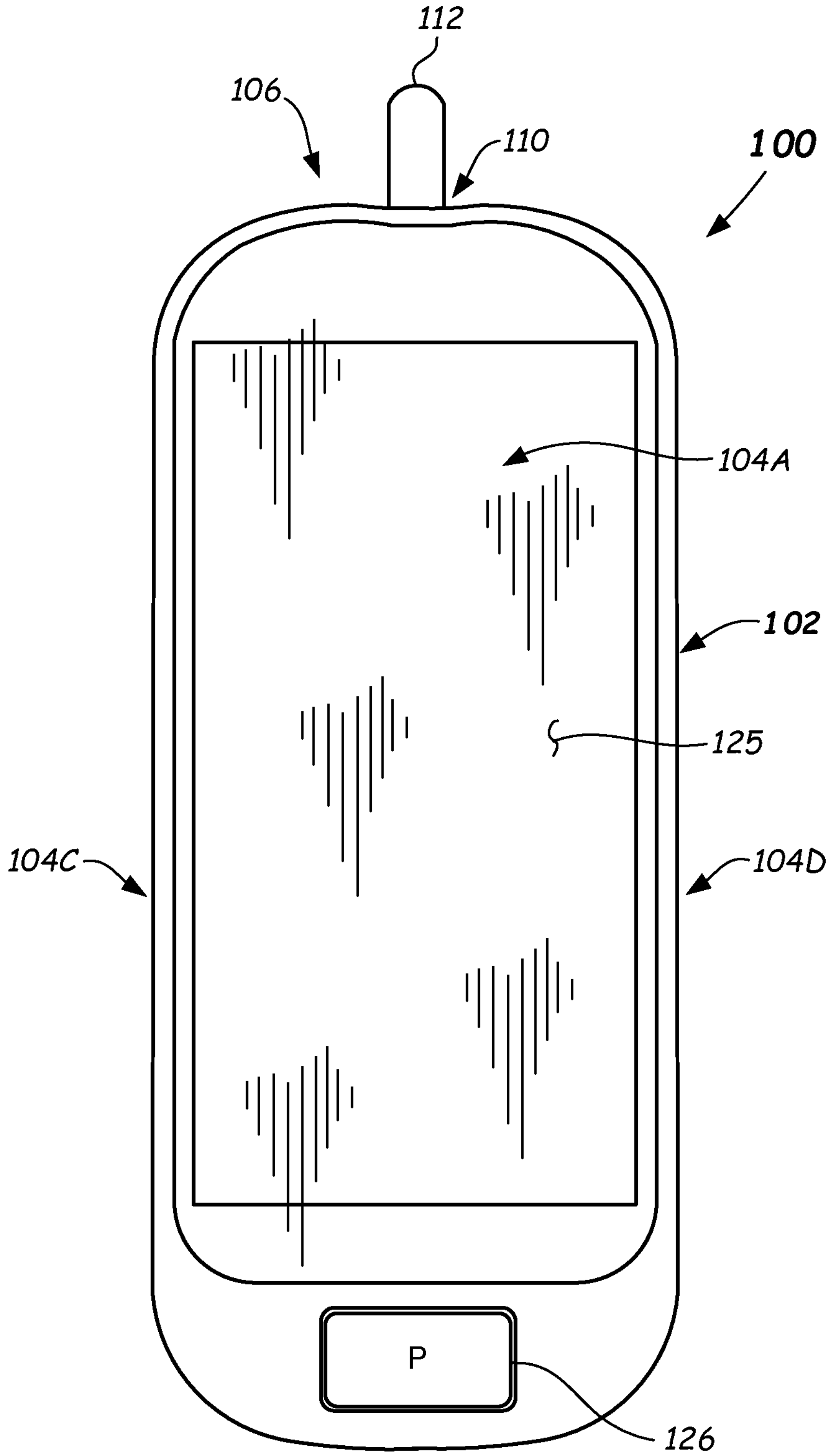
FIG. 1E is a front side plan view of the analyte meter of FIG. 1A illustrating one embodiment of a display screen comprising a touch screen according to embodiments of the disclosure.

In the depicted embodiment, as best shown in FIGS. 1A-1D, the engagement member 118 is configured to extend across the back side 104 of the housing body 102, such as between the first side 104C and the second side 104D. As is shown in FIGS. 1C and 1D, the engagement member 118 can further turn and extend at least part way alongside of the first side 104C and the second side 104D and towards the front side 104A. Thus, the engagement member 1As best shown in FIGS. 1C-1D and 2B, the engagement member 118 may be received in a recessed area 102R of the housing body 102.

In some embodiments, the engagement member 118 may include one or more ribs 118R, which are raised elongated elements that can have a dome-shaped profile. The one or more ribs 118R can provide a tactile feel to the engagement member 118 that improves contact with the user's digit (e.g., finger). As shown, the one or more ribs 118R may extend across the width of the engagement member 118. Additionally, the engagement member (118) can comprise a contact radius (R) contactable with a digit 119 (e.g., finger) of the user. Contact radius (R) can comprise a radius of from 3 mm to 8 mm, for example, or even 4 mm to 5 mm in some embodiments, and may extend over an arc of from 0 degrees to about 90 degrees, for example. Contact radius (R) may extend across a width of the engagement member 118, and may in some embodiments extend alongside of one or both of the first side 104C and second side 104D of the engagement member 118.

The test strip ejector 114 further includes a push member 120 coupled to the slide member 116 and moveable therewith. The push member 120 can be coupled at an end of the slide member 116 nearest the end 106 and can include a portion 120E positioned to be engageable with an end 112E of the test strip 112 in order to eject the test strip 112 from the receptacle formed in the test strip receiver 124. Push member 120 may be coupled to the slide member 116 by any suitable means, such as fasteners, snap fit features, adhesive, ultrasonic welding, and the like. Optionally, the push member 120 may be integrally formed with the slide member 116.

As shown, the push member 120 can be received in, and is slidable within, a test strip receiver 124. Test strip receiver 124 can be a molded plastic piece that has a plurality of electrical contacts 121, such as conductive electrical contacts formed (e.g., molded or otherwise fastened) therein and can further include a slot 124S formed therein. Test strip receiver 124 may be coupled to the printed circuit board 122, such as by fasteners, molded snap-in features, or the like. Suitable electrical connections (not shown) may be made between the electrical contacts 121A-121C and the processing circuitry 127P. Processing circuitry 127P is otherwise entirely conventional and is not further described herein. Push member 120 may reside in a slot 131 formed in the printed circuit board 127. An end 127E of the printed circuit board 127 opposite the slot 131 may couple to a power source 133 such as a battery contained inside of the second portion 102B. Suitable conventional battery terminals and battery securing structure can be included in the second portion 102B, and a portion of the second portion 102B may be removable to allow access to the power source, such that it can be changed out, as needed.

Figure 2B:
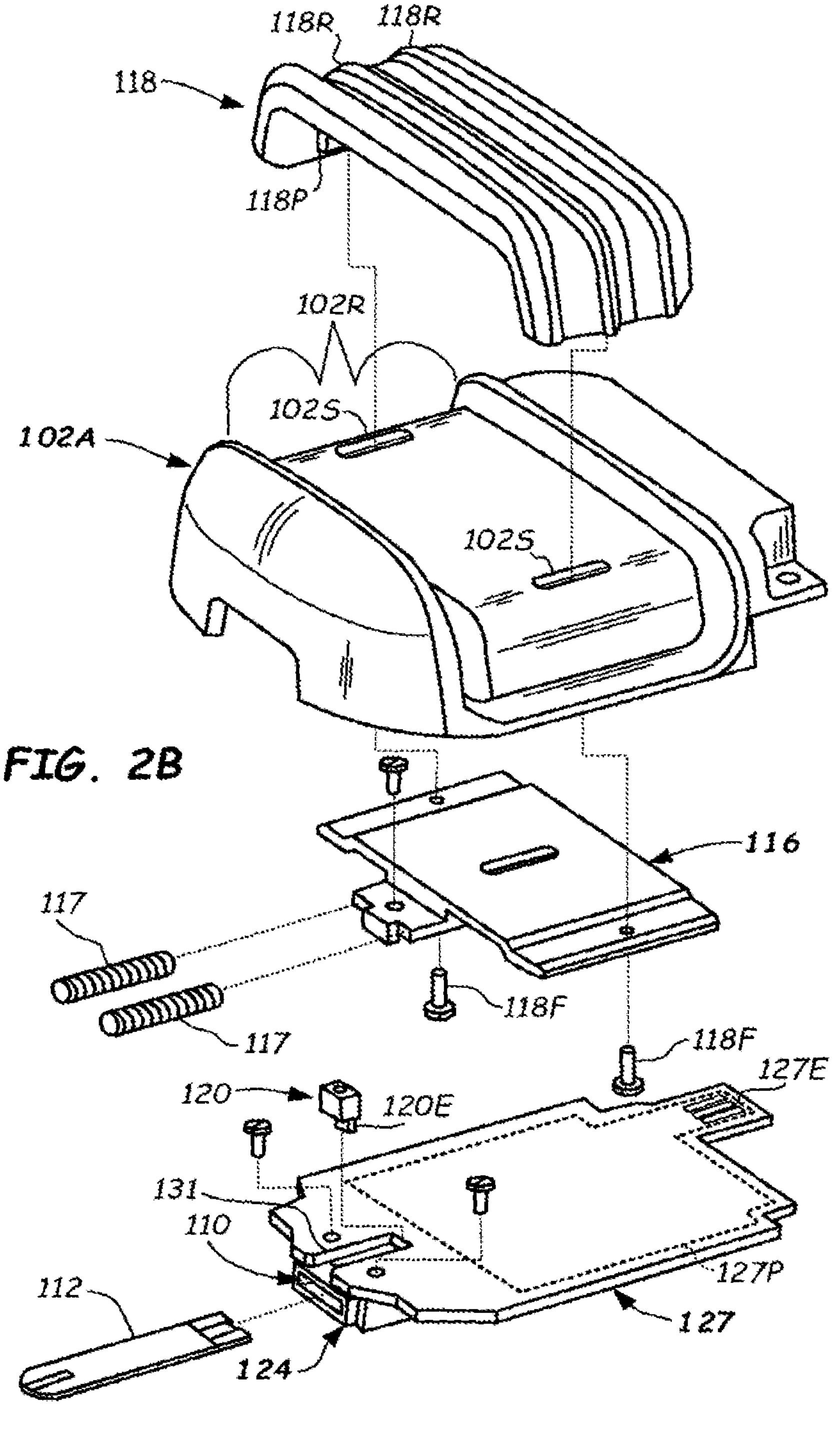
FIG. 2B is an exploded perspective view of various components of an example test strip ejector of the analyte meter provided according to embodiments of the disclosure.
Figure 3A:
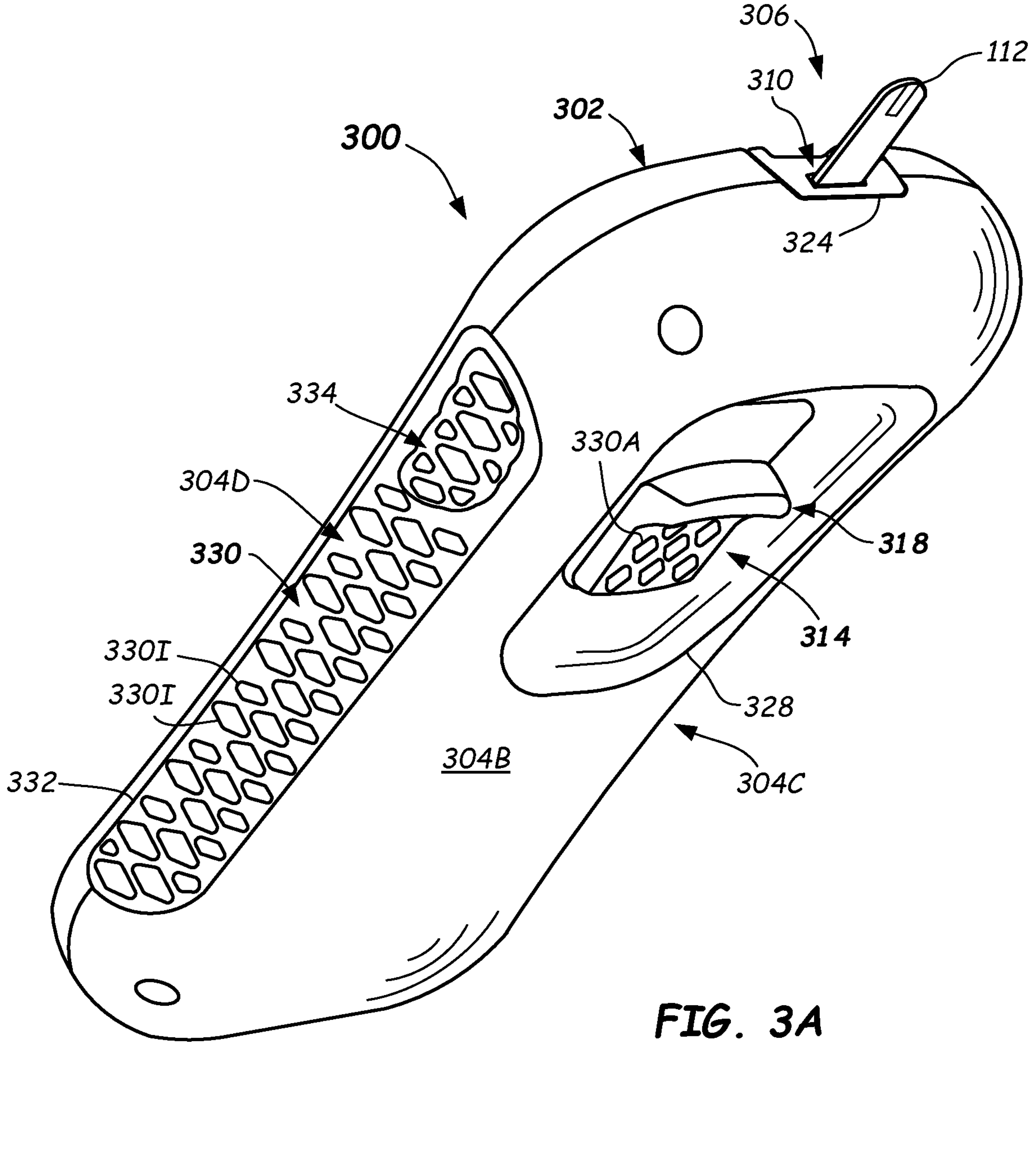
FIG. 3A is back-side perspective view of an alternate analyte meter including another configuration of test strip ejector provided according to embodiments of the disclosure.
Figure 3B:
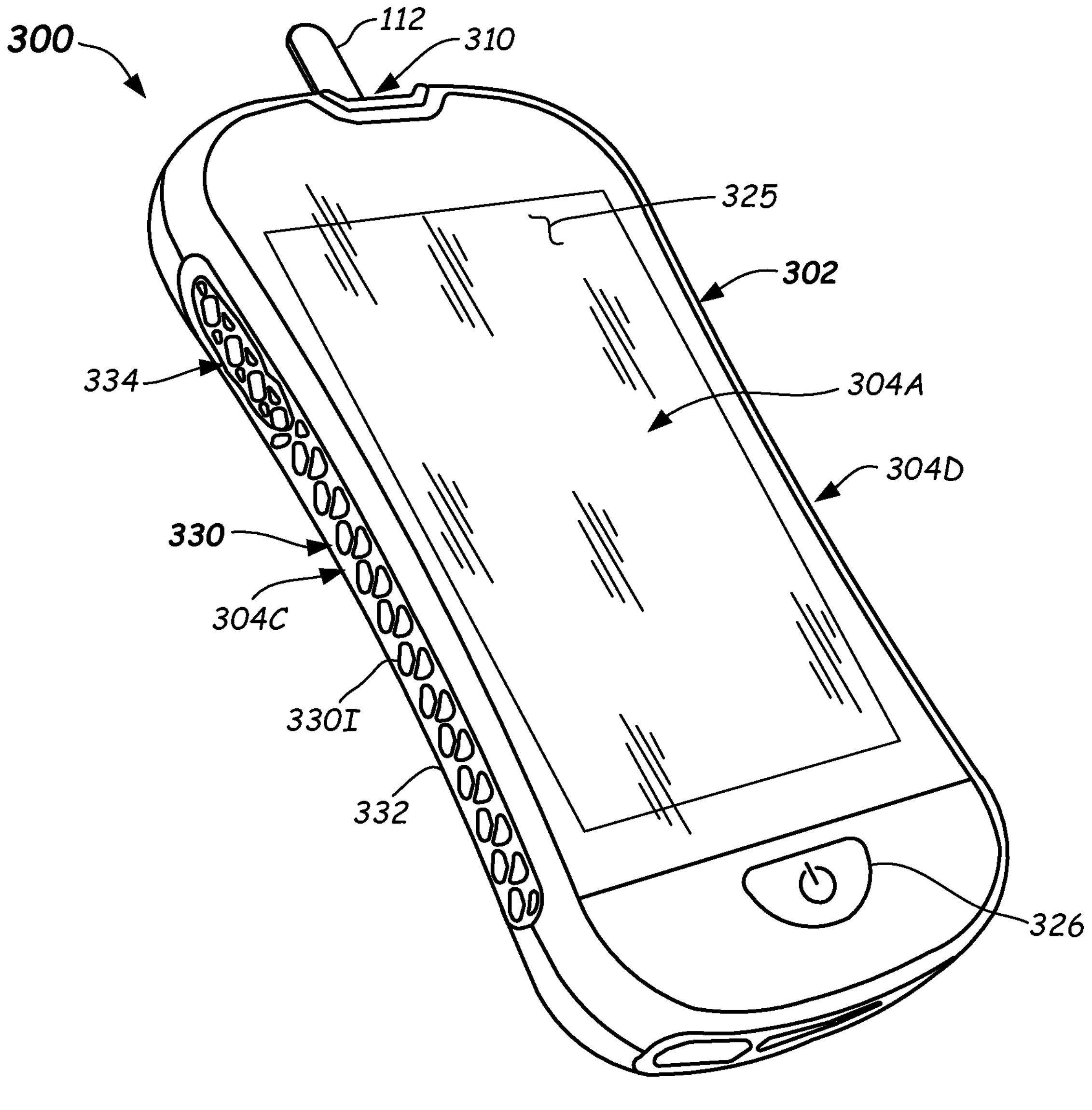
FIG. 3B is front-side perspective view of the alternate analyte meter of FIG. 3A provided according to embodiments of the disclosure.

FIGS. 3A-3B illustrates an alternative embodiment of an analyte meter 300 according to another aspect of the disclosure. The structure of the analyte meter 300 is similar to the aforementioned embodiment of FIGS. 1A-2E. In particular, the analyte meter 300 includes a test strip ejector 314 that is located on the back side 304B of the analyte meter 300 opposite of the front side 304A containing the display screen 325. The internal mechanism of the test strip ejector 314 is the same as shown in FIGS. 1F-1H and 2B including a slide member 116, push member 120, test strip receiver 124, and engagement member 318. However, the engagement member 318 is smaller than the engagement member 118 and is recessed within and resides in a pocket 328 formed in the back side 304B of the housing body 302. In some embodiments, the analyte meter 300 provides a sleek look by having the front side 304A include only a display screen 325 and a power button 326.

As before, the engagement member 318 connects to the slide member 116 in the same manner and in FIGS. 1F and 2B except that the slots 102S and posts 118P may be spaced closer together. As in the previous embodiment, pushing on the engagement member 318 of test strip ejector 314 operates to eject the test strip 112 from the test strip port 310 after use without having to touch the contaminated test strip 112. The springs 117 return the mechanism back to the starting position enabling the ejection of the next inserted test strip 112 after analyte measurement is completed. As can be seen in FIGS. 3A and 3B, tactile traction features 330 can be provided on the first side 304C and the second side 304D of the analyte meter 300 to enhance the gripping on the analyte meter 300 by the user.

Tactile traction features 330 can comprise repeated indented areas 3301, which may be provided in a substantially repeating pattern, or optionally in a random pattern. The repeated indented areas 3301 can be formed as indents in the housing body 302 that can be molded in, or optionally provided as molded insert strips that can be received and adhered into elongated side pockets 332 that can be formed in the housing body 302. The material of the tactile traction features 330 can be the same as the rest of the housing body 302 in some embodiments, or optionally can be a soft elastomer material, such as a gel-like material. For example, the soft elastomer material may be any suitable molded or cast material that is different (e.g., softer) than the other molded portions of the housing body 302. For example, the material may be a silicone, urethane, thermoplastic elastomer (TPE), or other “soft durometer” elastomer. “Soft durometer” as used herein means that the elastomer has a shore 00 durometer of less than 60, or even less than 30, for example. Likewise, tactile traction features 330A may be provided on the engagement member 318. For example, they may be provided as molded-in indents or possibly even raised features that enhance tactile feel of the engagement member 318.

Figure 3C:
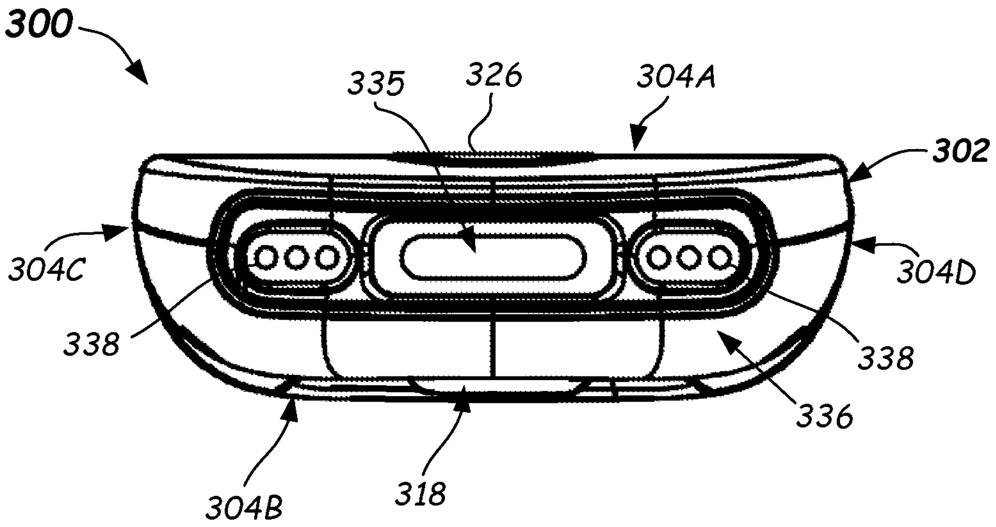
FIG. 3C is end plan view of the alternate analyte meter of FIGS. 3A and 3B provided according to embodiments of the disclosure.
Figure 4:
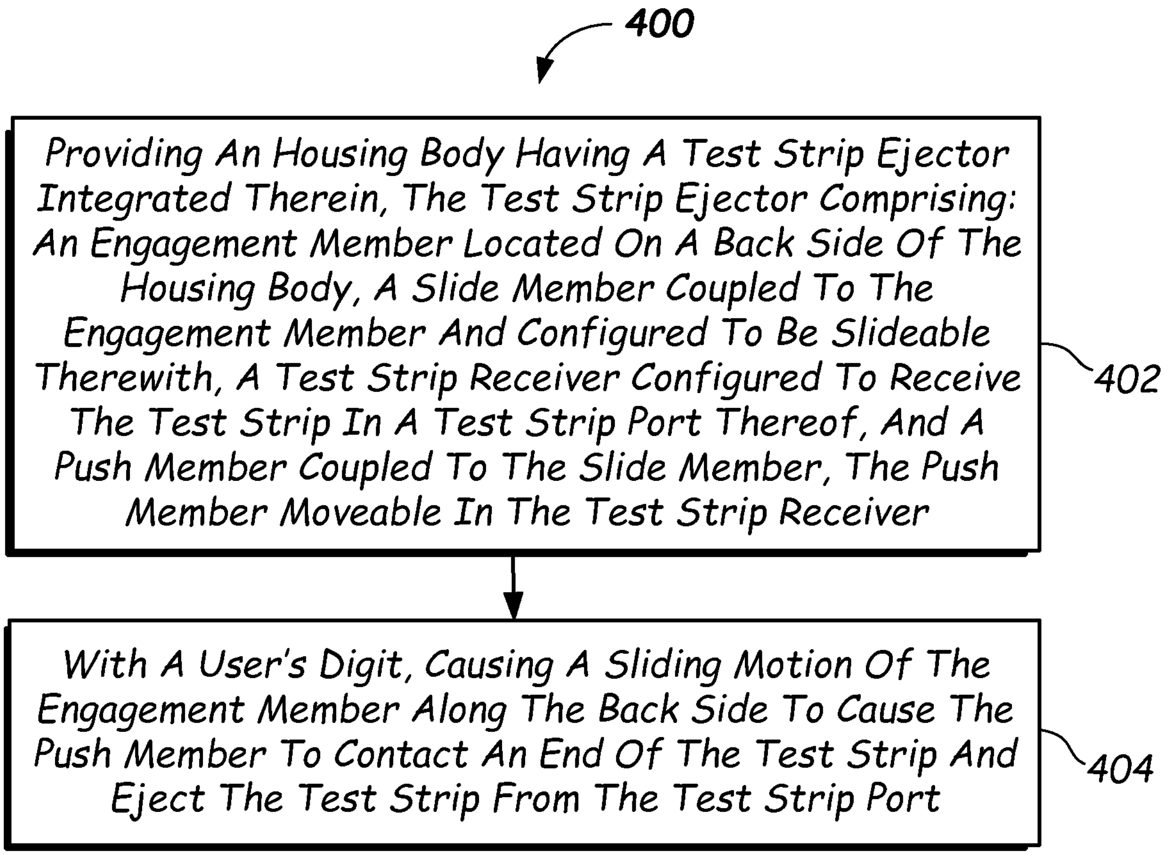
FIG. 4 is a flowchart illustrating a method of ejecting a test strip from an analyte meter according to embodiments of the disclosure.

In some embodiments, as shown on FIGS. 3A, 3B, and 3C, one or more scanner buttons 334 can be included, which when depressed, initiate a scanner function of the analyte meter 300. The scanner function may be used to scan information about the scanning clinician, the patient, the test strip (e.g., calibration constant), and/or control solution. The scanner function may be initiated, in either a one button or two button configuration, by depressing one or depressing both of the scanner buttons 334 with either a digit or digits (e.g., finger, thumb, or both). Depressing the one or more scanner buttons 334 can close a micro-switch, which in turn closes a circuit and initiates scanning by a scanner apparatus 335 located at the second end 336 opposite the end 306. Scanning can be stopped by re-depressing one or both of the scanner buttons 334. The scanner buttons 334 can be located on one or both of the first side 304C and the second side 304D of the housing body 302. In some embodiments, the scanner buttons 334 are redundant, meaning either one can be depressed to initiate and stop the scanning function. The scanner function, which may be embodied as a barcode reader, may be located at any suitable location on the housing body 302, such as at the second end 336. Any conventional barcode reader construction may be used. The barcoded information may be embodied in a 1D or 2D barcode, such as a Code 39, Code 128, Interleaved 2 of 5, universal product code (UPC), international article number EAN, portable data file 417 (PDF417), data matrix, or quick response (QR) code. Additionally included at the second end 336 may be one or more charging ports 338, which can be of any suitable construction to allow charging of a rechargeable power source.

In another aspect, a test strip ejector 114, 314 is provided. Test strip ejector 114, 314 comprises an engagement member 118, 318, slide member 116, test strip receiver 124, 324, and a push member 120. Engagement member 118, 318, is configured to be contacted by a user’s digit 119, the engagement member 118, 318 extending across a back side 104B, 304B of a housing body 102, 302. The slide member 116 is coupled to the engagement member 118, 318 and is slidable thereby, namely sliding motion of the engagement member 118, 318 along the back side 104B, 304B towards the end 106, 306. The test strip receiver 124, 324 is configured to receive a test strip 112 in a test strip port 110, 310 thereof. The push member 120 is coupled to the slide member 116, and the push member 120 is moveable in the test strip receiver 124, 324 and configured to contact an end of the test strip 112. Sliding motion of the engagement member 118 along the back side 104B, 304B causes the test strip 112 to be ejected from the test strip port 110, 310.

In another aspect, methods of operating the analyte meter (e.g., analyte meter 100, 300) to a eject test strip 112 from a test strip port (e.g., test strip port 110, 310) are described herein. The method 400 of ejecting a test strip 112 from an analyte meter 100, 300, comprises, in block 402, providing an housing body 102, 302 having a test strip ejector 114, 314 integrated therein, the test strip ejector 114, 314 comprising: an engagement member 118, 318 located on a back side 104B, 304B of the housing body 102, 302; a slide member 116 coupled to the engagement member 118, 318 and slidable therewith; a test strip receiver 124, 324 configured to receive the test strip 112 in a test strip port 110, 310 thereof; and a push member 120 coupled to the slide member 116, the push member 120 moveable in the test strip receiver 124, 324.

The method 400 further includes, in block 404, with a user’s digit, causing a sliding motion of the engagement member 118, 318 along the back side 104B, 304B to cause the push member 120 to contact an end 112E of the test strip 112 and eject the test strip 112 from the test strip port 110, 310.

The foregoing description discloses only example embodiments of analyte meters, test strip ejectors, and methods of operating analyte meters. Modifications of the above-disclosed analyte meters, test strip ejectors, and methods which fall within the scope of the disclosure will be readily apparent to those of ordinary skill in the art. Accordingly, while the present disclosure has been disclosed in connection with example embodiments thereof, it should be understood that other embodiments may fall within the scope of claims and their equivalents.

What is claimed is:

1. An analyte meter, comprising:

a housing body including a front side, a back side opposing the front side, a first side, a second side opposing the first side, and an end, the housing body further comprising:

an internal chamber;

a recessed area disposed on the back side of the housing body; and a test strip receiver having a test strip port at the end of the housing body and configured to receive a test strip therein;

a display screen disposed on the front side of the housing body;

a printed circuit board disposed within the internal chamber, the printed circuit board comprising a push-member slot including a cutaway portion extending through a thickness of the printed circuit board;

a scanner located at a second end of the housing body opposite the end with the test strip port;

a first scanner button on the first side of the housing body;

a second scanner button on the second side of the housing body, wherein depressing the first scanner button and the second scanner button simultaneously initiates a scanning function of the scanner; and a test strip ejector configured to eject the test strip from the test strip port of the test strip receiver, the test strip ejector further comprising:

a slide member slidable relative to the housing body;

an engagement member coupled to the slide member and configured to be contacted by a user, the engagement member located on the back side of the housing body within the recessed area of the housing body, the engagement member comprising:

a back engagement surface recessed beneath an external surface of the housing body; and a plurality of ribs disposed on the back engagement surface and extending across the back engagement surface, wherein the plurality of ribs protrude out of the recessed area past the external surface of the housing body; and a push member extending from the slide member toward the front side of the housing body through the push-member slot and into the test strip receiver such that an end portion of the push member is positioned to engage with the test strip.

2. The analyte meter of claim 1, wherein the plurality of ribs extends across a width of the engagement member.

3. The analyte meter of claim 2, wherein the plurality of ribs extend from the first side to the second side.

4. The analyte meter of claim 1, further comprising one or more springs in contact with the slide member that bias the engagement member to a retracted starting position.

5. The analyte meter of claim 1, wherein the engagement member comprises a contact radius contactable with a digit of the user.

6. The analyte meter of claim 5, wherein the contact radius extends across a width of the engagement member.

7. The analyte meter of claim 6, wherein the contact radius extends across the width and alongside at least one of the first side or the second side of the engagement member.

8. The analyte meter of claim 6, wherein the contact radius comprises a radius between 3 mm and 8 mm.

9. The analyte meter of claim 1, wherein the engagement member straddles the housing body.

10. The analyte meter of claim 1, further comprising tactile traction features on the first side and the second side of the analyte meter to enhance gripping of the analyte meter.

11. The analyte meter of claim 10, wherein the tactile traction features comprise repeated indented areas provided in a pattern.

12. A test strip ejector, comprising:

a housing body including an internal chamber and a recessed area disposed on a back side of the housing body;

a display screen disposed on a front side of the housing body;

a printed circuit board disposed within the internal chamber, the printed circuit board comprising a push-member slot including a cutaway portion extending through a thickness of the printed circuit board;

an engagement member configured to be contacted by a user, the engagement member located on the back side of the housing body within the recessed area of the housing body, the engagement member comprising:

a back engagement surface recessed beneath an external surface of the housing body;

a first curved edge at a first end of the back engagement surface extending along a first portion of a first side of the housing body;

a second curved edge at a second end of the back engagement surface extending along a second portion of a second side of the housing body; and a plurality of ribs disposed on the back engagement surface and extending from the first curved edge across the back engagement surface to the second curved edge, wherein the plurality of ribs protrude out of the recessed area past the external surface of the housing body;

a slide member coupled to the engagement member and slidable by a sliding motion of the engagement member;

a test strip receiver configured to receive a test strip in a test strip port;

a scanner;

a first scanner button on the first side of the housing body;

a second scanner button on the second side of the housing body, wherein depressing the first scanner button and the second scanner button simultaneously initiates a scanning function of the scanner; and a push member extending from the slide member toward the front side of the housing body, through the push-member slot and into the test strip receiver such that an end portion of the push member is positioned to engage with a test strip end of the test strip, wherein the sliding motion of the engagement member along the back side of the housing body causes the test strip to be ejected from the test strip port by the end portion of the push member that is in contact with an end of the test strip sliding with the sliding motion of the engagement member.

13. A method of ejecting a test strip from an analyte meter, comprising:

providing a housing body and a test strip ejector, wherein the housing body comprises a front side, a back side, a first side, a second side, and an end, the housing body further comprising:

an internal chamber, a display screen disposed on the front side of the housing body, a printed circuit board disposed within the internal chamber, the printed circuit board comprising a push-member slot including a cutaway portion extending through a thickness of the printed circuit board, a recessed area disposed on the back side of the housing body, a test strip receiver having a test strip port at the end configured to receive the test strip therein, a scanner located at a second end of the housing body opposite the end having the test strip port, a first scanner button on the first side, and a second scanner button on the second side;

depressing the first scanner button and the second scanner button simultaneously to initiate a scanning function of the scanner, wherein the test strip is configured to eject the test strip from the test strip port of the test strip receiver, wherein the test strip ejector comprises:

a slide member slidable relative to the housing body, an engagement member coupled to the slide member and configured to be contacted by a user, the engagement member located on the back side of the housing body opposite the front side containing the display screen, the engagement member comprising:

a back engagement surface recessed beneath an external surface of the housing body, a first curved edge at a first end of the back engagement surface extending along a first portion of the first side, a second curved edge at a second end of the back engagement surface extending along a second portion of the second side, and a plurality of ribs disposed on the back engagement surface and extending from the first curved edge across the back engagement surface to the second curved edge, wherein the plurality of ribs protrude out of the recessed area past the external surface of the housing body, and a push member extending from the slide member toward the front side of the housing body through the push-member slot and into the test strip receiver such that an end portion of the push member is positioned to engage with the test strip; and with a user's digit, causing a sliding motion of the engagement member along the back side to cause the push member to contact the end of the test strip and eject the test strip from the test strip port.

14. The analyte meter of claim 10, wherein the tactile traction features comprise molded insert strips that are received and adhered to the housing body.

15. The analyte meter of claim 1, wherein the scanner is a barcode reader.

16. The analyte meter of claim 1, wherein a limit stop contacts the slide member when the slide member is in a final extended position.

17. The analyte meter of claim 16, wherein the limit stop comprises a first stop member and a second stop member that prevents further movement of the slide member.

18. The analyte meter of claim 1, wherein the engagement member comprises one or more curved concave surfaces configured to receive a digit of the user.

19. The analyte meter of claim 1, wherein the display screen comprises a thin film transistor liquid crystal display (TFT LCD).

20. The analyte meter of claim 1, wherein the test strip receiver includes one or more conductive leaf springs configured to electrically connect to one or more electrical contacts of the test strip.

21. The analyte meter of claim 1, wherein the printed circuit board includes a connection end opposite the push-member slot that couples to a power source contained in the housing body.

22. The analyte meter of claim 21, wherein a portion of the housing body is removable to allow access to the power source.

23. The analyte meter of claim 1, wherein the engagement member further comprises:

a first curved edge at a first end of the back engagement surface extending along a first portion of the first side; and a second curved edge at a second end of the back engagement surface extending along a second portion of the second side.

* * * * *